United States Patent [19]

Yang

[11] 4,176,384

[45] Nov. 27, 1979

[54] MAGNETIC RECORDING HEAD ASSEMBLY DEFINING PRECISION GAPS

[75] Inventor: Charles S. Yang, Santa Barbara, Calif.

[73] Assignee: Yang Electromagnetics Systems Inc., Ventura, Calif.

[21] Appl. No.: 905,734

[22] Filed: May 15, 1978

[51] Int. Cl.² .......................... G11B 5/27; G11B 5/42
[52] U.S. Cl. ..................................... 360/121; 360/118; 360/129
[58] Field of Search ....................... 360/118, 120–122, 360/125, 128–129

[56] References Cited

U.S. PATENT DOCUMENTS

| 3,485,958 | 12/1969 | Bos et al. .......................... 360/118 X |
| 3,964,103 | 6/1976 | Thompson et al. ............. 360/118 X |

FOREIGN PATENT DOCUMENTS 2625464  12/1976  Fed. Rep. of Germany ........... 360/129

*Primary Examiner*—John H. Wolff
*Attorney, Agent, or Firm*—William W. Haefliger

[57] ABSTRACT

A magnetic head assembly includes read/write pole elements having tip structure flush with slide surfaces on separate mounts, the latter mounting erase poles having ends at opposite sides of the read/write pole tip structure. Separate coils may be located about the erase poles; and notches may be located in the mounts at opposite sides of the read/write pole elements to provide a controlled throat dimension.

6 Claims, 10 Drawing Figures

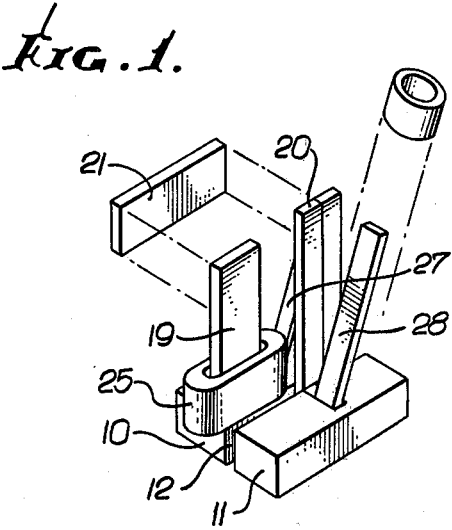
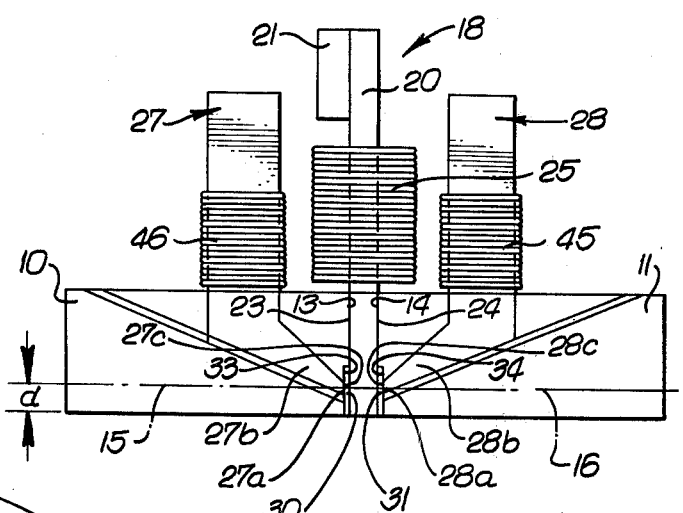
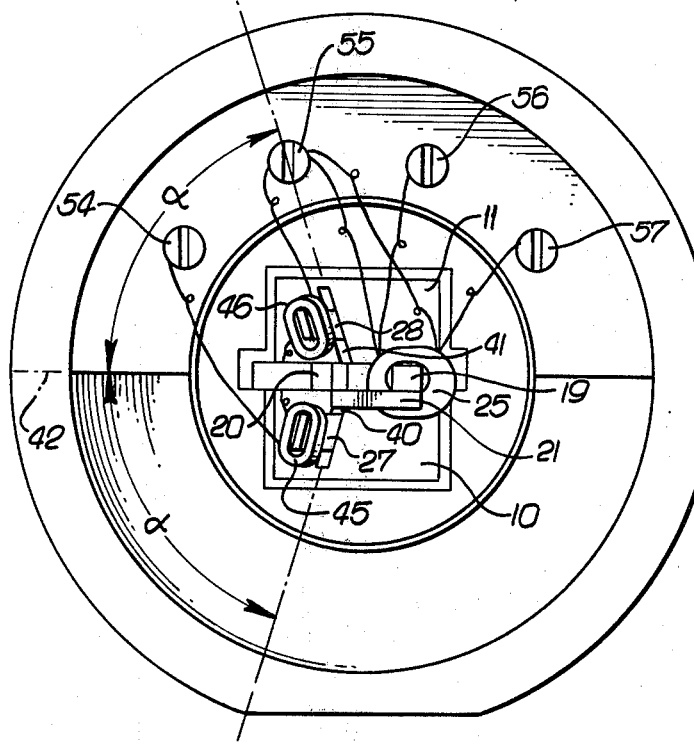
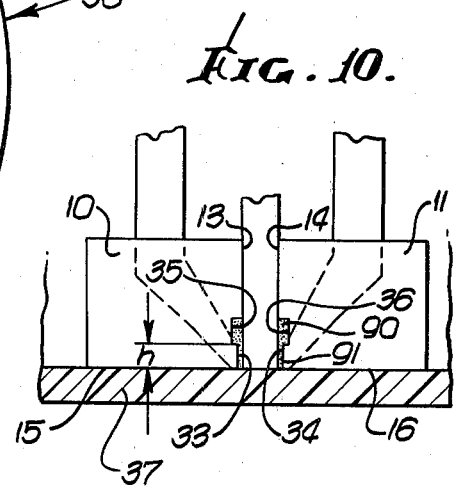
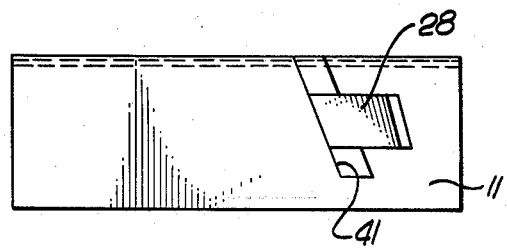

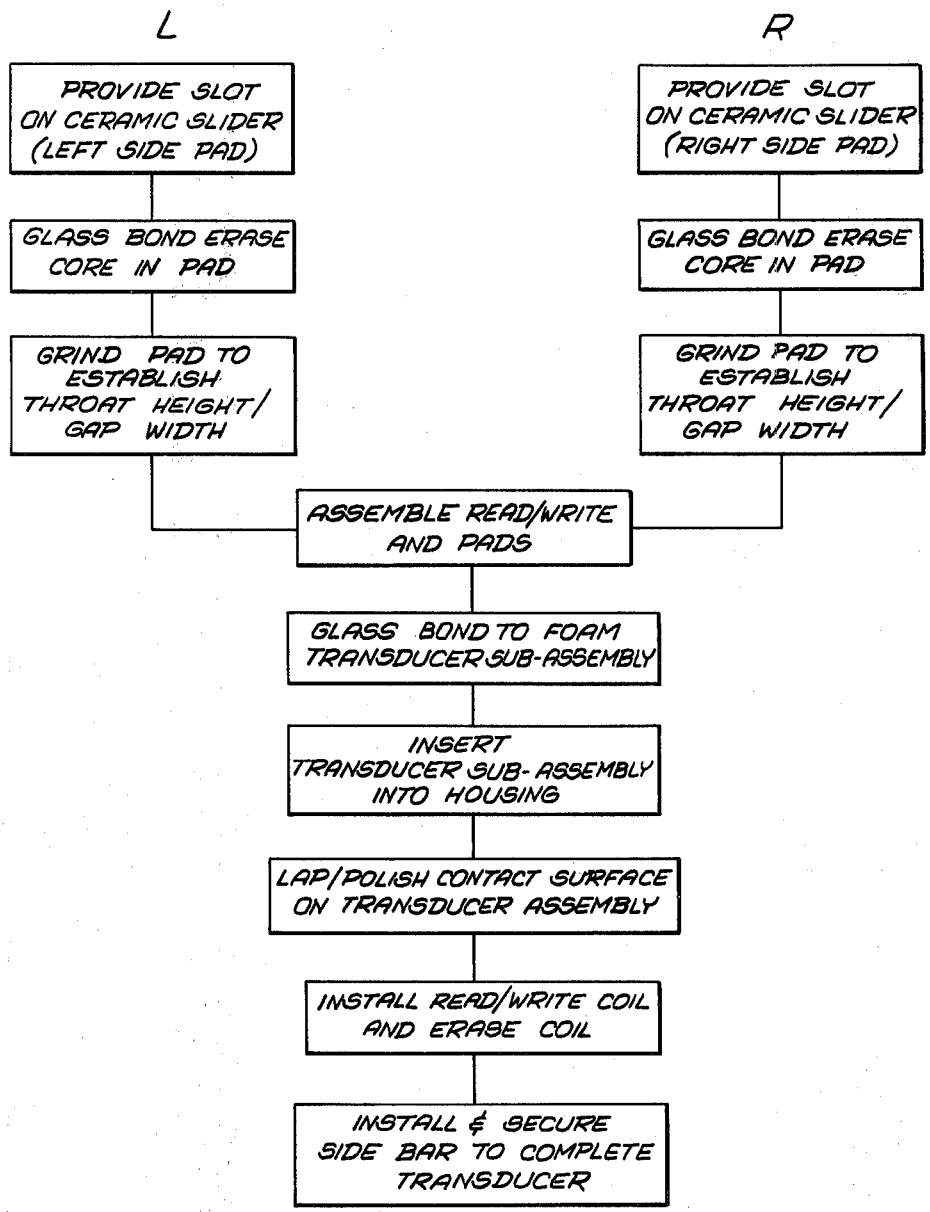

MAGNETIC RECORDING HEAD ASSEMBLY DEFINING PRECISION GAPS

BACKGROUND OF THE INVENTION

This invention relates generally to magnetic head assemblies, and more particularly concerns significant improvements in the structure of such assemblies, leading to economies in fabrication and adjustment.

Prior head assemblies are typified by that disclosed in U.S. Pat. No. 3,964,103 to Thompson et al. As there shown, the single ceramic slider block employed requires cutting of orthogonal slots in same to receive both read/write and erase pole pieces. This is a costly and time consuming operation. Also, the throat between the erase pole pieces is formed so as to lack sufficiently close control; and no provision is made for peak shift adjustment, as respects the erase pole pieces. Also, that assembly lacks other unusual advantages in structure, mode of operation and fabrication, and operating results as are found in the present invention.

SUMMARY OF THE INVENTION

It is a major object of the invention to provide a magnetic head assembly of significantly improved construction which overcomes the above described as well as other problems associated with prior assemblies. Basically, the invention is embodied in a head assembly that comprises:

(a) mounting means defining slide surfaces,
(b) read/write pole means having tip structure proximate and substantially flush with said slide surfaces,
(c) erase poles having ends proximate and substantially flush with said slide surfaces, said erase pole ends located at opposite sides of the read/write pole tip structure, and
(d) said erase poles being spaced apart, and there being separate coils located about the erase poles.

As will be seen, the mounting means typically comprises separate mounts for the respective erase poles and separately located relative to the read/write pole means to determine gaps; the mount inner surfaces have locating portions adjacent the read/write pole means as well as second and offset portions spaced closer to the erase pole ends to set the gap widths; and notches may be formed in the mounts to define a controlled throat dimension between the erase pole ends. Further, the erase poles may have separate coils thereabout to allow differential winding adjustment for purposes as will appear; the erase poles project in non-perpendicular relation to the read/write pole structure; and the erase poles extend in non-upright relation relative to their mount blocks and relative to upright read/write poles or legs, as will appear, fabrication of the assembly being thereby facilitated.

These and other objects and advantages of the invention, as well as the details of an illustrative embodiment, will be more fully understood from the following description and drawings, in which:

DRAWING DESCRIPTION

FIG. 1 is a perspective view of magnetic head structure incorporating the invention;

FIG. 2 is an enlarged elevation taken in section through the completed assembly;

FIG. 3 is a bottom view of a housing containing the FIG. 2 magnetic head assembly;

FIG. 8 is a plan view taken on lines 8—8 of FIG. 7;

FIG. 9 is a block diagram illustrating the method step sequence in producing the completed unit of FIGS. 3–5; and FIG. 10 is a view like FIG. 2, showing a modification, employing the FIG. 6 structure.

DETAILED DESCRIPTION

Figure 4:
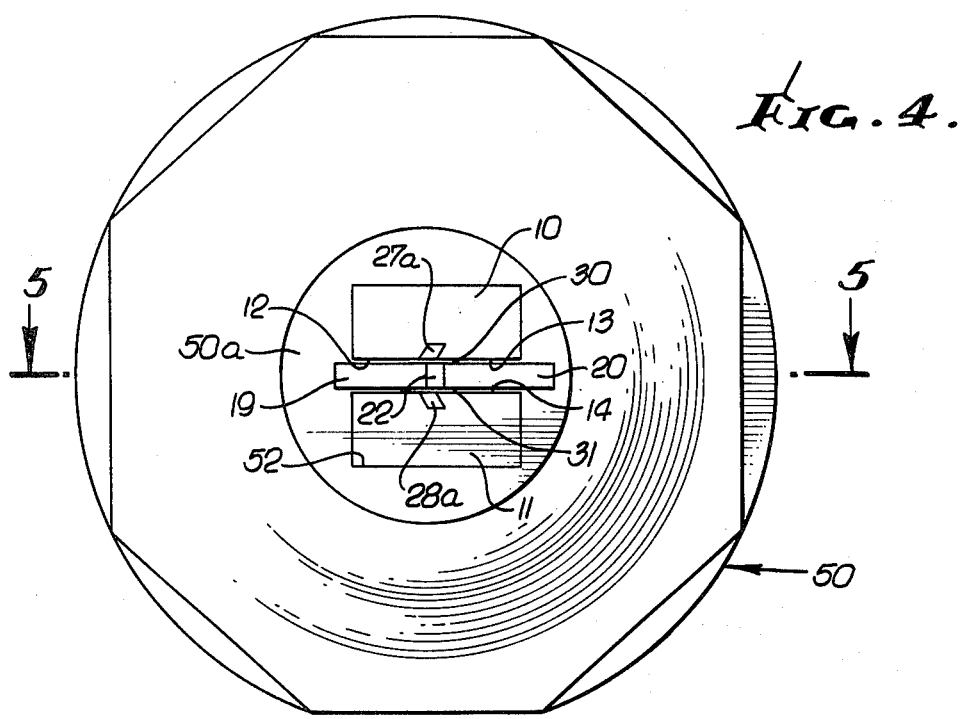
FIG. 4 is a top plan view of the FIG. 3 housing and the bottom slide surface of the magnetic head assembly incorporated in the housing.

In the drawings, mounting means defining slide surfaces may include two rectangular blocks 10 and 11 which extend in elongated parallel relation. A space 12 separates locating portions 13 and 14 of parallel opposed faces of the two blocks, in their assembled condition, and their undersides 15 and 16 define slide surfaces as seen in FIG. 10. These surfaces are formed by grinding off the bottoms of the blocks to a depth "d" indicated in FIG. 2, after the blocks are assembled to pole means to be described. Blocks 10 and 11 typically consist of ceramic material such as barium titanate.

Read/write pole means typically includes a magnetic core 18 (typically of ferrite) having upright legs 19 and 20 to which a magnetic cross-piece 21 is connected, as by bonding, to form a U-shaped unit. The lower ends of the legs define tips including pole faces at opposite sides of a narrow gap indicated at 22 (as seen in FIG. 4). That gap may contain fused glass. The legs or pole pieces extend within the slot 12, and the opposed faces 13 and 14 of the blocks 10 and 11 may be joined to the opposite sides of the pole pieces, as at 23 and 24, whereby the width of the gap 12 is determined by the widths of the pole pieces, such latter widths being the same. A read/write coil 25 is installed about one of the legs, as for example leg 19.

Figure 6:
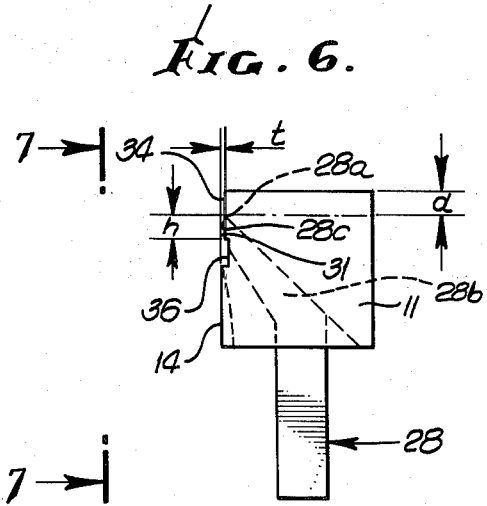
FIG. 6 is an end elevation showing details of a slider sub-assembly.

Also provided are ferrite erase poles 27 and 28 having ends 27a and 28a which are proximate and substantially flush with the slide surfaces 15 and 16. Such poles have tip portions 27b and 28b which extend or are angled inwardly to terminate at said ends 27a and 28a which are located at opposite sides of the read/write pole top structure, as viewed in FIG. 4. The erase poles also have inner surfaces 27c and 28c facing opposite sides of the read/write pole means, but spaced therefrom to define gaps 30 and 31 each of thickness "t", as seen in FIG. 6. Such gaps appear in FIGS. 2 and 4. Those narrow gaps (typically about 0.001 inch) are typically filled with fused glass, and they extend the lengths of the mounting blocks. For this purpose, the inner surfaces of the two blocks have locating surfaces 13 and 14 (previously described) proximate to and facing opposite sides of the read/write poles, such locating portions spaced from the erase pole ends. The mounting blocks inner surfaces also have second portions 33 and 34 which extend between the locating portions 13 and 14 and the erase pole ends 27a and 28a, and which are outwardly offset relative to the locating portions 13 and 14. Accordingly, the gaps 30 and 31 are defined between second surface portions 33 and 34 and the read/write poles. Fused glass may be filled into such gaps.

The modification shown in FIG. 10 is closely similar to the FIG. 2 configuration, except that notches 35 and 36 are formed in mounts or blocks 10 and 11 to interrupt the second surface portions 33 and 34, whereby the height "h" of the narrowed throat defined between the surface portions 33 and 34 is interrupted by the notches to define a precisely controlled throat across which erase flux extends during the erase operation. This ensures precise control of erase flux at the magnetized surface of the tape or other magnetic means 37 over which the slider relatively passes. Note the glass bonded into the notches and gaps, at 90 and 91.

It will also be noted that the slide surfaces 15 and 16 extend generally horizontally; that the read/write pole legs 19 and 20 extend upright substantially vertically; and that the erase poles 27 and 28 are tilted from vertical throughout their lengths, and that they have parallelogram cross sections as seen in FIG. 3. Accordingly, their lower angled portions 27b and 28b do not extend normal to the upright plane defined by read/write legs 19 and 20, but rather at angles thereto as is clear from FIG. 3. As there shown, the slots 40 and 41 in blocks 10 and 11 which receive angled portions 27b and 28b extend at acute angles α relative to that upright plane 42.

The construction facilitates the use of separate coils 45 and 46 about the erase core legs. The use of two such coils permits differential adjustment of the number of turns in the two coils to "fine tune" the erase pole structure so as to obtain peak shift adjustment to compensate for erase field effect and write field effect. Also, the open loop erase structure is simpler than closed loop structures.

Figure 5:
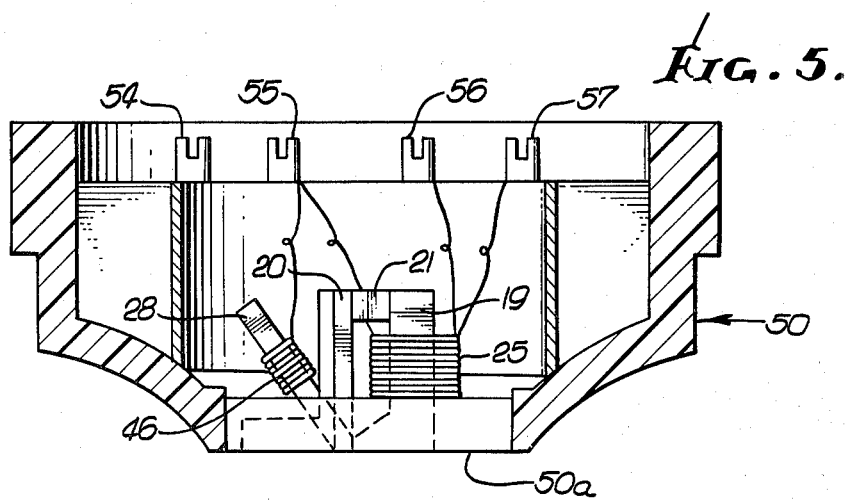
FIG. 5 is an elevation taken in section on lines 5—5 of FIG. 4.
Figure 7:
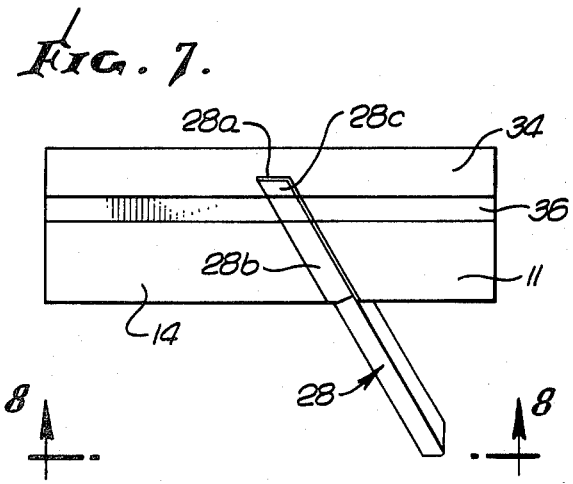
FIG. 7 is a side elevation of the FIG. 6 sub-assembly, and taken on lines 7—7 of FIG. 6.

Also shown in FIGS. 3-5 is a housing 50, typically consisting of non metallic material, such as a synthetic resin, the housing having an end surface 50a defining an opening as at 52 to receive the above structure, including blocks 10 and 11. Synthetic resin or plastic typically extends about the opening and embeds the blocks. Coil wire terminals 54-57 are also carried by the housing.

FIG. 9 illustrates the steps involved in fabricating the magnetic head assembly as described. The use of ceramic blocks 10 and 11 substantially simplifies the overall fabrication process, over prior processes, since their assembly operates to define the gap therebetween.

I claim:

1. In a unitary magnetic head assembly, the combination comprising
   (a) read/write poles having opposite sides defining upright, parallel vertical planes, said poles having tips,
   (b) two ceramic blocks respectively abutting said opposite sides and being in mutual registration, the blocks having local recesses therein extending laterally away from said upright opposite sides and the blocks having upright inner surfaces adjacent said recesses and respectively facing laterally toward said opposite sides,
   (c) and two erase poles respectively carried by said blocks, said erase poles having inner surfaces flush with the respective block inner surfaces thereby to define gaps between the erase pole inner surfaces and the read/write pole opposite sides, whereby the gap widths are defined by the widths of the recesses in the blocks,
   (d) the blocks having bottom slide surfaces, the erase poles having ends flush with said slide surfaces, and the read/write poles having tips flush with said slide surfaces.

2. The combination of claim 1 including fused glass filling said gaps.

3. The combination of claim 2 wherein the blocks have notches therein directly above said recesses and extending away from said read/write poles to greater extent then the recesses, and fused glass filling said notches.

4. The combination of claim 1 wherein the erase poles have free ends projecting above the levels of said blocks, and separate coils about said erase poles.

5. The combination of claim 1 wherein said erase pole ends have parallelogram shapes.

6. The combination of claim 1 including a housing having an end opening, said blocks located in said opening, and plastic material about said opening and embedding said blocks.

* * * * *